Patented Oct. 13, 1936

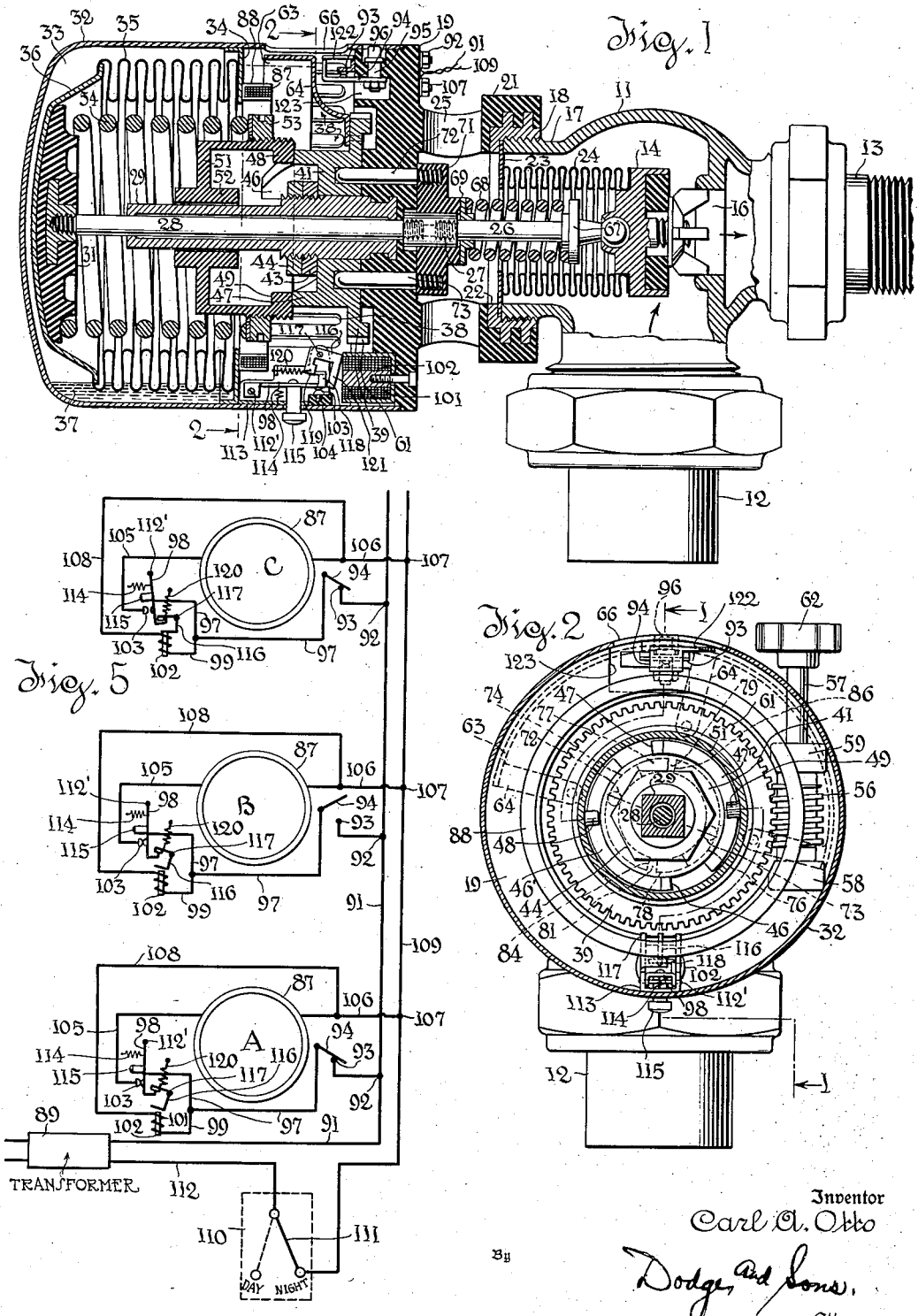

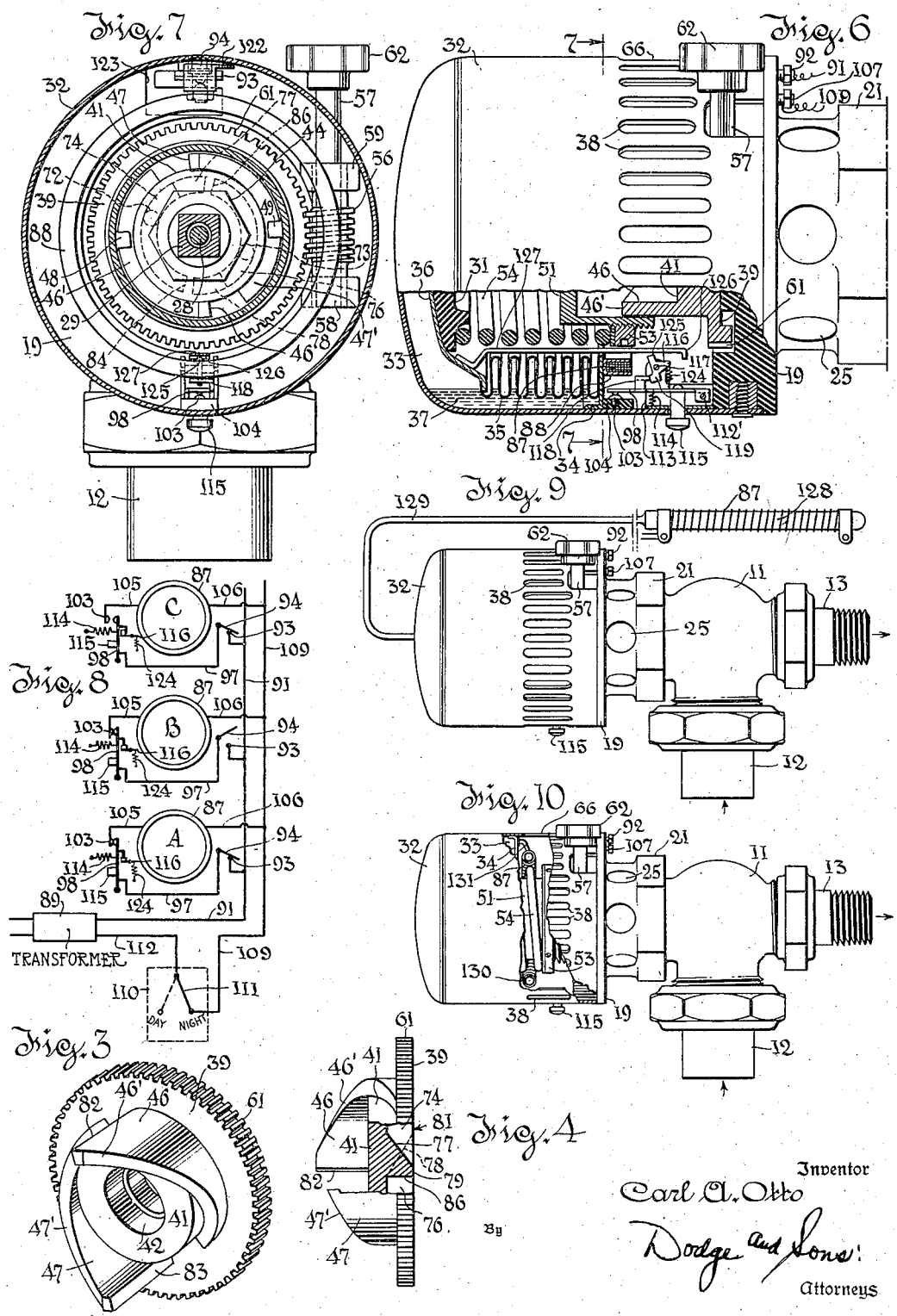

2,057,050

UNITED STATES PATENT OFFICE 2,057,050

TEMPERATURE REGULATION

Carl A. Otto, Milwaukee, Wis., assignor to Johnson Service Company, Milwaukee, Wis., a corporation of Wisconsin Application July 13, 1933, Serial No. 680,301

17 Claims. (Cl. 236—68)

The present invention pertains to temperature regulation, and particularly to what may be termed dual temperature thermostatic systems, i. e., systems designed to maintain one temperature during the day and another during the night.

In systems of the above-mentioned type which include what is known as selective group control, it is possible to maintain a relatively high, normal temperature throughout the building in the daylight hours and a lower temperature during the night, the change from one setting to the other being effected at a remote central station by the engineer or janitor. In certain of these systems, the temperature is positively regulated at one level during the day and at another during the night.

It is the purpose of the present invention to provide an electrically controlled system of the character last mentioned wherein the selective group control scheme is applied to what may be termed direct connected thermostats, that is, those in which the thermally responsive means operate directly on the heat controller. More specificially, it is proposed to furnish electrical dual control for automatic radiator valves of the direct control type, viz., radiator valve devices or regulators wherein the thermostat for actuating the valve and the local regulating means therefor are mounted directly on the valve body, by providing electrical heating or biasing means on the individual thermostats and arranging for general or group control of the individual heating means from a central remote point by the janitor.

A further purpose of the invention is to provide an electrical type, direct control heat regulator of the above type which includes local means for permanently locking the regulator against group control from the central point so that, if desired, it may maintain day temperature at all times. Means are provided to prevent operation of the locking means by unauthorized persons. Another object is to provide, in addition to the feature just mentioned, but incidental thereto, a lock-out device also local to each heat regulator, which may be operated to establish day conditions temporarily at that regulator, while the system as a whole remains set or biased for night operation. Such a device is adapted to maintain day temperature until the next time the central control is operated to establish night setting after having been moved to day time setting.

A further object is to furnish a direct control type heat regulator, including temporary lockout means on the instrument, adapted for operation, during night setting at the central control, to cause the heating medium to flow for a relatively short period of time, whereupon the regulator automatically returns to night setting.

The inventive concept is applicable to a wide range of direct control heat regulators, but is particularly adapted to the heat regulator construction described in my copending application Serial No. 680,300, filed July 13, 1933, and hence is illustrated and described in connection therewith. Since this heat regulator includes adjusting means located on the instrument whereby it may be set for normal day time operation or for sub-normal night operation, these adjustments will hereinafter be referred to as the local dual control for day and night operation to distinguish them from the remote control means for this purpose which comprises the subject matter of the present improvements. It is intended that the arrangement be such that either the remote dual temperature control or the local dual temperature control may be used as desired.

In the accompanying drawings which illustrate several practical embodiments of the invention:—

Fig. 1 is a longitudinal section of one form of the heat regulator of my prior application showing the present invention applied thereto, the view being taken on line 1—1 of Fig. 2. The local control means are set for day time operation and the valve is open, while the local switch for the remote control is closed and the electrical heating means are operating, assuming the remote control switch is in "night" position.

Fig. 2 is a vertical section taken on line 2—2 of Fig. 1.

Fig. 3 is a perspective of the manually adjustable double cam for locally setting the device either for day time or night operation.

Fig. 4 is an edge view of the cam broken away partly to show the several cam surfaces.

Fig. 5 is a diagram of the system showing it applied to three radiator valves.

Fig. 6 is a front elevation, partly broken away, of a modified form of the heat regulator with the local control means set for day time operation, the local switch (not shown) closed, and the electrical heating means operating to hold the valve proper (not shown) in closed position, local lockout means being provided whereby the valve may be caused to open for a short period during night setting of the remote control and then close again automatically.

Fig. 7 is a section on line 7—7 of Fig. 6.

Fig. 8 is a diagram of the system, similar to Fig. 5, but employing heat regulators of the modified form of Figs. 6 and 7.

Fig. 9 is a front elevation of another modified form of the heat regulator showing my improvements applied to a regulator adapted for use in an extended tube system.

Fig. 10 is a front elevation, partly broken away, of still another modified form of the heat regulator.

Referring first to Figs. 1 to 5, 11 represents a valve casing, 12 a pipe leading from the heating fluid supply, and 13 an outlet coupling adapted for connection to a radiator or the like (not shown). A reciprocatory valve 14 is mounted for operation in casing 11 to control passage of heating fluid through a port 16 in the valve casing.

A threaded hollow extension 17 on valve casing 11 carries a bonnet structure which supports the automatic thermostatic means and the local manual adjusting means for controlling the position of valve 14 with reference to port 16. This bonnet structure comprises an internally threaded metal collar 18 secured to casing extension 17 and a disk-like member 19 of insulation material having a neck 21 molded onto the collar.

Collar 18 is formed with a flange 22 between which and the end of casing extension 17 is clamped an annulus 23. Within casing 11 is a flexible bellows 24, the outer end of which is secured to annulus 23, while the inner end of the bellows is attached to valve 14. Both of these connections are fluid-tight, and, hence, there is thus provided a packless joint which prevents leakage at this point but permits free movement of valve 14 at all times. A series of openings 25 in neck portion 21 provides for ventilation at this point and prevents undesirable transmission of heat between the parts.

A stem 26 extends from valve 14 and connects, by means of an insulation piece 27, to a valve actuating rod 28. Rod 28 extends freely through insulation member 19 and a tubular guide member 29 rigidly supported at its inner end in insulation member 19. The outer end of rod 28 is detachably secured to a piston head 31 of insulation material.

A metallic shell 32 fits over and is detachably secured to bonnet member 19 in any suitable manner. The outer closed end of shell 32 forms the outer walls of a thermic cell 33. An annulus 34 is secured on the inside of shell 32. One end of a flexible corrugated bellows 35 is secured to annulus 34, while the other end of the bellows is attached to a metallic disk 36 bearing against piston head 31. Located in cell 33, as indicated at 37 in Fig. 1, is a quantity of volatile liquid, such for example as ethyl chloride. A series of slots 38 in shell 32 permits free circulation of air therethrough and into contact with cell 33.

Mounted for oscillatory movement on guide member 29 adjacent disk member 19 is a cam member 39 having a hub 41 with an opening 42 therethrough. Member 29 is threaded to receive a nut 43 and a lock nut 44 to prevent longitudinal movement of cam 39. The outer face of the cam has a pair of diametrically opposed arcuate cam portions 46, 47 having cam surfaces 46', 47', respectively.

Cam portions 46, 47, when the regulator is locally adjusted for high temperature operation as appears in Fig. 1, engage diametrically opposed lugs 48, 49, respectively, formed on a cup-shaped member 51. Member 51 has an extended bearing 52 which supports it for lengthwise adjustment on guide member 29, by means of cam 39, as explained later. Member 29 and the passage through bearing 52 are of rectangular or other suitable cross section to prevent rotation of member 51. The latter is threaded externally at its inner end to receive a ring nut 53 between which and piston head 31 a coil spring 54 is arranged under tension.

Thus, it will be clear that spring 54 constantly tends, through the operative connections described, to open valve 14. Operating in opposition to the force of this spring and tending to close the valve, is the vapor pressure present in thermic cell 33 when the room temperature exceeds the boiling point of the volatile liquid therein. As long as the room temperature remains relatively low, so that there is insufficient vapor pressure in the cell to overcome the resistance of spring 54, the latter will hold the valve open (as appears in Fig. 1) and permit heating fluid to flow to the radiator, thereby raising the room temperature. Consequently, the vapor pressure in the cell is increased, and, when this becomes sufficient to overcome the resistance of spring 54, bellows disk 36 will move inwardly, resulting in closing of valve 14 through the connections described. In this manner, flow of heating fluid past the valve will be discontinued until the room temperature drops sufficiently again to cause operation of the device to open the valve.

Local regulation of the normal or day time room temperature is obtained by proper adjustment of the tension of spring 54. This is effected by rotating cam 39 in either a clockwise or a counter-clockwise direction, as appears in Fig. 2. For this purpose the cam is provided with a manually operable worm drive. In this connection, bonnet member 19 is recessed to accommodate a worm 56 (see Fig. 2) secured on a shaft 57 arranged in suitable bearings 58, 59 on member 19. Worm 56 meshes with teeth 61 on the periphery of cam 39. Shaft 57 projects through an opening in shell 32 and has an operating knob 62 secured to its outer end.

Referring to Figs. 1 and 2, which show an intermediate high or day time, local setting of the regulator, it will be noted that the position of cam 39 is such that lugs 48, 49 engage cam surfaces 46', 47' intermediate their ends and thus cup-shaped member 51 is held in an outer position to compress spring 54. Hence, spring 54 is held under a definite tension adapted to cause the device to operate to maintain a predetermined relatively high temperature. If a higher room temperature is desired, cam 39 is turned clockwise to the desired extent by means of knob 62. In this manner, cup-shaped member 51 is forced outwardly and further compresses spring 54, as a result of which a higher room temperature must be attained to cause the thermic cell to overcome the spring and close the valve.

If a lower room temperature is to be obtained by local adjustment, proper operation of knob 62 will cause counter-clockwise movement of cam 39 and thereby bring the lower portions of cam surface 46', 47' opposite lugs 48, 49 and permit spring 54 to expand. The tension of the spring having been reduced, a lower room temperature will produce sufficient vapor pressure in thermic cell 33 to close the valve. Location of the thermostatic head 33 at one side of the valve casing prevents heated air rising from the casing from interfering with proper operation of the thermally responsive means.

An arcuate indicator strip 63 is mounted on cam 39 by a series of arms 64 secured thereto. After calibrating the device, suitable graduations or other indicia may be provided on the outer face of strip 63. These may be observed through an opening 66 in shell 32, so as to indicate when cam 39 has been turned sufficiently to cause the regulator to maintain a desired normal room temperature or to provide the local low temperature setting described below.

The local, low temperature or night setting feature, which includes manually closing valve 14, will be described only insofar as this is necessary to a complete understanding of the present invention. Valve stem 26 is provided with an annular flange 67 against which bears one end of a light coil spring 68 surrounding the valve stem. The other end of the spring bears against a collar 69 slidably mounted on the valve stem.

Mounted for sliding movement on insulation piece 27 is a disk of insulation material 71, with the inner face of which spring-pressed collar 69 engages. Disk 71 has mounted on its outer face a pair of diametrically opposed pins 72, 73 extending through openings provided for the purpose in bonnet member 19.

On its inner face, cam 39, as shown most clearly in Figs. 2 and 4, is formed with a pair of diametrically opposed arcuate grooves 74, 76. These grooves, as appears from Fig. 2, are formed on a smaller diameter than are cam portions 46, 47 and extend into hub 41 of cam 39. Pins 72, 73 normally project into grooves 74, 76, respectively, opposite the flat bottom surfaces of these grooves, as shown in Fig. 1.

The opposite ends of grooves 74, 76 are provided, respectively, with inclined cam surfaces 77, 78 which, upon sufficient rotation of cam 39 in a counter-clockwise direction, engage pins 72, 73 and force them, together with valve 14 and the interposed parts, inwardly to the low temperature or night setting, valve closed position. In thus closing the valve, disk 71 is moved inwardly sufficiently partially to compress spring 68 so that the tension thereof maintains the valve tightly, but yieldably, against its seat. The parts are so proportioned that at this time pins 72, 73 engage flat portions 79, 81 of cam 39, and ends 82, 83 of cam portions 46, 47 engage lugs 48, 49 to limit rotation of the cam in a counter-clockwise direction. Rotation of the cam in a clockwise direction is limited by engagement of the ends 84, 86 of cam grooves 74, 76 with pins 72, 73.

In operation it will be clear that, as explained, manipulation of knob 62 to bring lugs 48, 49 into engagement with cam surfaces 46', 47' will set the regulator so that the valve or other heat controller will be automatically operated to maintain a definite, relatively high room temperature corresponding to the position of the lugs on the cam surfaces. As shown in Fig. 2, cam portions 46, 47 and grooves 74, 76 are angularly arranged on cam 39 so that, whenever lugs 48, 49 engage cam surfaces 46', 47', pins 72, 73 are not engaged by cam surfaces 77, 78. Hence, these pins and disk 71 to which they are attached are free to move to their outermost position of Fig. 1 and thus do not interfere with normal day time operation of the regulator.

However, when cam 39 is rotated counter-clockwise toward sub-normal setting position, lugs 48, 49 move out of engagement with cam surfaces 46', 47', and cam surfaces 77, 78 engage pins 72, 73 to move the parts to the local low temperature setting position already described. Thus, valve 14 is held closed yieldably by the tension of spring 68, but is adapted to open automatically to a limited extent, this being permitted by further compression of the spring, to raise the room temperature should it fall below a predetermined minimum.

This minimum temperature setting point is determined by the relationship between the strength of springs 54 and 68 and the vapor pressure in cell 33 when the valve 14 is closed and the regulator set for night operation. Spring 68 is lighter than spring 54, so that the latter tends to open the valve, but the parts are so proportioned and adjusted that vapor pressure in cell 33 sufficient to urge the valve toward closed position, together with the force of spring 68, will be sufficient to overcome spring 54 and hold the valve closed.

Ethyl chloride has a boiling temperature 54° F. If this liquid is used, the vapor pressure in cell 33 at temperatures above 54° F. will cause valve 14 to remain closed. However, at 54° F. or lower, insufficient pressure will be exerted by the vapor tension to operate cell 33 and the expansive tendency of spring 54 will force valve 14 open against the closing pressure of spring 68. Opening of the valve is restricted to less than normal by engagement of the convolutions of spring 68 with each other. This is advantageous, because only a limited flow of heating fluid is necessary to maintain the desired low room temperature. As soon as this temperature is reached, vapor pressure in cell 33 and spring 68 operate to close the valve again. Obviously, a volatile liquid having a different boiling point from that of ethyl chloride may be used, in which case the predetermined sub-normal temperature below which the regulator would operate to open the valve would be different.

The heat regulator construction thus far described together with the local adjusting means therefor, is that of my copending application already referred to. The remote control, dual temperature adjusting means for the heat regulator and the system formed by a plurality of said regulators, whereby the temperature adjustment of the valves may be readily changed from a high temperature setting to a low temperature setting, and vice versa, will now be described.

As explained, sufficient vapor pressure produced in thermic cell 33 when the parts are in the local, day time setting, valve open position of Fig. 1, functions to move valve 14 toward closed position and thus to lower the room temperature. The amount of this pressure is controlled by the balance of temperature between the inflow of heat from the valve body and the cooling effect of the surrounding air. If the inflow of heat be increased, the resulting rise in pressure in cell 33, if sufficient will move the valve toward closed position, thereby lowering the temperature of the surrounding air. This increases the cooling effect of the air until it balances the increased inflow of heat. This is the principle utilized in designing by remote control, dual temperature adjusting means.

The necessary additional heat for biasing the thermally responsive means of the heat regulator unit so as to urge the valve toward or into closed position and thereby effect a remotely controlled, low temperature or "night" setting of the device, is created by an electric current of low voltage, say twenty-five volts, flowing through a resistance heating coil 87. This coil is located within shell 32 of the regulator, preferably in close proximity to thermic cell 33. As shown in Fig. 1, heating coil 87 is mounted in a ring 88 of U-shaped cross section, while the ring is soldered to annulus 34 in order to insure a quick transfer of heat from the heating coil to cell 33 when current is supplied to the coil.

Referring more particularly to Fig. 1 and to Fig. 5 which is a diagram showing the wiring for a plurality of heat regulators A, B, and C, each equipped with a heating coil 87, current flows from transformer 89 over conductor 91 to each regulator, whence it passes from binding post 92 mounted in bonnet 19 to switch contact 93. A pivoted switch lever 94 coacts with contact 93 and provides a permanent, locally operable lockout for heating coil 87, which, when open, renders the heating coil inoperative.

In order to prevent tampering therewith by unauthorized persons, switch arm 94 is adapted for key operation. For this purpose it is rigidly secured to a bolt 95 mounted for oscillatory movement in bonnet 19. Head 96 of bolt 95 projects through a suitable opening in shell 32 and is so shaped as to be operable only by a correspondingly designed key.

If switch 94 is closed, as appears in Fig. 1 and in regulator A in Fig. 5, current flows therefrom through conductor 97, and then, partly to temporary lock out or switch 98 for coil 87, and partly, by way of conductor 99, to coil 101 of an electromagnet 102 attached to bonnet member 19. When switch 98 is closed against its cooperating contact point 103, which latter is mounted in an insulation piece 104 attached to shell 32, current flows from said contact point through conductor 105, heating coil 87 and conductor 106 to a second binding post 107 mounted in bonnet member 19. From coil 101 of the electro-magnet current also flows to binding post 107 by way of conductors 108 and 106.

The current from binding post 107 then passes along conductor 109 to the central or remote control station 110 where, if the main switch 111 is in closed or "night" position, the current passes therethrough and back to the transformer 89 by way of conductor 112 to complete the circuit. It will be noted from Fig. 5 that the electrical controlling means for the individual heat regulators are connected in parallel so that each regulator unit operates independently of the others.

As appears in detail in Figs. 1 and 2, the temporary lock out or switch for heating coil 87 comprises the switch arm 98 which is pivoted at 112' in the sides of a U-shaped bracket 113 attached to the inside of shell 32. A coil spring 114 normally maintains the switch closed, but a push button 115 mounted on switch 98 and projecting outside of shell 32 provides means for readily opening the switch temporarily for the purpose described below.

A U-shaped latch 116 is pivoted at 117 on bracket 113 and is adapted to engage with switch 98 and secure it temporarily in open position when moved inwardly by button 115. For this purpose, switch 98 is formed with a hook portion 118 and latch 116 with a coacting hook portion 119. A coil spring 120 serves to maintain latch 116 normally in non-latching position.

When switch 94 is closed, electro-magnet 102 is energized. Thus, leg 121 of latch 116, which leg is located in close proximity to the electromagnet, is constantly drawn toward the electromagnet and thereby tends to turn latch 116 against the resistance of spring 120. Hence, if push button 115 is operated at this time, hook portions 118, 119 engage and serve to hold switch 98 open until the electro-magnet 102 is deenergized. When this takes place, as would be the case were either local switch 94 or central switch 111 opened, spring 120 causes the latch to return to its normal, non-latching position, thereby releasing switch 98 and permitting spring 114 to return it to its normal closed position.

In order to indicate when the heat regulator is set for remote control, switch 94 carries a target 122 which bears the words "Dual" and "Day", or similar indicia (not shown). The word "Dual" may be observed through opening 66 in shell 32 when switch 94 has been locked in closed position to indicate that the setting of the regulator is subject to change by the janitor from the central station 110. The word "Day" will be displayed at opening 66 when the switch is locked in open position, at which time the body proper of the switch is disposed in a recess 123 provided for the purpose in bonnet member 19.

In operating the system, which obviously may include any desired number of heat regulators of which three are shown by way of example in Fig. 5, switch 111 at the remote control station normally or during the day time will be in the open or "day" position indicated by the dotted line. Hence, assuming the regulators A, B, and C are set locally for day time operation, each regulator will continue to operate at the relatively high temperature setting determined by the degree of compression of its spring 54.

If, however, the janitor desires to lower the temperature, as at night, in the several rooms in which the heat regulators A, B, and C are located, he closes central switch 111 by moving it to the solid line "night" position. As a result, all heat regulators on which switch 94 is in closed or "dual" position will be supplied with current and thus adjusted to night setting by the application of heat to their thermic cells through coils 87. In other words, the valve of each heat regulator thus adjusted to night setting, if closed, will open to raise the temperature only when it drops below a predetermined sub-normal level, instead of the normal temperature for which the regulator is locally set. If the valve is open, it will move toward closed position as soon as the sub-normal temperature is attained. Of course, any heat regulator on which switch 94 is in open or "day" position (see regulator B, Fig. 5) will remain unaffected and continue to operate according to the local setting, since no current is supplied to its heating coil 87.

The above-mentioned predetermined low temperature or sub-normal level below which the valve again functions is determined by the capacity of heating coil 87. The greater the heating capacity, the lower would be the sub-normal temperature setting, and the less the heating capacity, the higher the sub-normal temperature setting. When the heat produced by the coil to act on thermic cell 33, and thus bias valve 14 toward closed position, is dissipated by the cooling effect of the surrounding air as a result of the low temperature setting of the device, the valve will again function with the heating coil still supplying heat.

With regard to all such heat regulators as have been adjusted for low temperature operation by the remote control as explained above, if anyone should desire to restore a regulator to high temperature setting, this can readily be accomplished by pressing push button 115. As already explained, this opens switch 98 which is caught and temporarily held by latch 116, the latter being drawn into position for this purpose by electromagnet 102. Switch 98 being open, the flow of current to heating coil 87 is discontinued, and, as soon as the heat produced thereby is dissipated, the heat regulator functions in accordance with the local day time or high setting thereof. This condition appears in heat regulator C of Fig. 5, while heat regulator A shows the position of the parts before the switch or temporary lock-out 98 has been operated.

When central switch 111 is returned to open or "day" position, electro-magnet 102 is deenergized. Latch 116 is then returned by spring 120 to its normal position and thus permits spring 114 again to close switch 98. In this manner, the temporary lock-out is automatically restored to its original condition so as to provide for flow of current to coil 87 the next time central switch 111 is moved to low temperature position.

The construction and operation of the heat regulator and system disclosed in Figs. 6, 7, and 8 is the same as that of Figs. 1-5 just described, except that switch or temporary lock-out 98 has been modified so as to operate in a somewhat different manner. Hence, most of the description of the preferred embodiment of the device already set forth will apply to the modified construction.

Switch 98 of the modification, similarly to switch 98 of the preferred construction of Figs. 1-5, is for the purpose of locally restoring any individual heat regulator to high setting after the system as a whole has been indexed to low temperature setting by the closing of remote control switch 111. Referring particularly to Fig. 6, it will be seen that switch 98 is reversed as compared with the arrangement of Figs. 1-5. The switch arm is pivoted at 112' in bracket 113, while the outer end of the switch normally engages contact point 103 mounted in insulation piece 104, the switch being urged toward this position by spring 114. Push button 115 serves for manual actuation of the switch as before. Latch 116 is pivoted at 117 on bracket 113 for engagement with switch 98 to hold it temporarily in open position when pushed inwardly by button 115. Hook portion 118 on switch 98 and hook portion 119 on latch 116 are adapted to engage for this purpose. A coil spring 124 normally urges latch 116 against hook portion 118 of the closed switch 98 to effect engagement of hook portions 118, 119, when the switch arm swings inwardly. Latch 116 has an extension 125 adapted to be engaged by the bent end 126 of a rod 127 extending through bellows 35 and rigidly secured at its opposite end to bellows disk 31, as explained below.

The heat regulator of Figs. 6 and 7 is shown as locally adjusted for high temperature operation with switch 94 closed. This corresponds to the condition of heat regulator A of Fig. 8, and, since central switch 111 is closed, heating coil 87 is operating to bias the valve 14 (not shown) into or toward closed position. At this time, rod end 126 is located considerably to the right of latch extension 125 (see Fig. 6). When switch 98 is opened by push button 115 and caught by latch 116 as explained (see heat regulator C, Fig. 8), the flow of current to coil 87 is discontinued. As coil 87 cools off, the vapor pressure in thermic cell 33 falls slowly, because of the lower temperature of the surrounding atmosphere. Spring 54 will then expand to force bellows disk 31 outwardly and thus gradually move valve 14 toward open position.

As valve 14 reaches full open position, end 126 of rod 127 engages and releases latch 116 so as to allow switch 98 to return to its original, closed position of Fig 6. The regulator has now been reset automatically to its remote control, low temperature setting and will again start to close valve 14, because of the heat furnished by coil 87. In the meantime, however, sufficient heating fluid has entered the radiator controlled by valve 14 to warm up the room for a short period of time.

Fig. 9 illustrates one application of the present invention to an extended tube type of heat regulator. The construction and operation of this regulator and the system in which it is used is the same as that of either of the regulators of Figs. 1-5 or Figs. 6-8, except that the electrical resistance coil 87 for biasing the thermally responsive means of each regulator is wound around the bulb 128 of an extended tube 129 communicating with the interior of thermic cell 33 instead of being located within the regulator shell 32. One end of heating coil 87 is adapted for connection to contact 103 of switch 98 and the other to conductor 106 (see Figs. 1 and 5). Temporary lock-out or switch 98 of Figs. 1-5 or that of Figs. 6-8 may be used with this regulator.

Bulb 128, as is well understood, is to be located in the space, the temperature of which is to be controlled, and this, together with the intimate association of heating coil 87 with the bulb, insures accurate and reliable regulation of the temperature.

Another mode of applying the heating coil 87 is illustrated in Fig. 10. This shows a regulator like those of Figs. 1-5 and 6-8, except that thermic cell 33 communicates with a hollow annulus 130 by means of a tube 131. This annulus 130, which in effect becomes a part of cell 33 and surrounds spring 54, has the heating coil 87 wound therearound. This arrangement is preferred for use with heat regulators operated by liquid expansion, since the whole length of the heating element 87 is in direct contact with the liquid container, and, hence, a very effective heat transfer to the liquid is possible.

It will be clear from the above that, in each of the arrangements or constructions described, either the remote dual temperature control or the local dual temperature control may be utilized as desired.

What is claimed is:—

1. The combination in a dual temperature heat regulator of a thermally responsive motor; a heat controller mechanically connected directly to said motor to be actuated thereby in response to room temperature changes, said motor being adapted for operation at a normal temperature level or at a sub-normal temperature level; an electrical heater element arranged in close proximity to said thermally responsive motor and adapted, when operated, to bias the regulator for sub-normal operation by modifying the effect of the motor on the controller; an electrical circuit in which said heater element is located; a remotely located switch in said circuit for controlling the heater element independently of temperature variations; and a local switch for the heat regulator arranged in said circuit and adapted to be opened to prevent operation of the heater element when the remote switch is closed, said local switch being adapted for key operation to preclude unauthorized manipulation thereof.

2. The combination in a dual temperature heat regulator of a thermally responsive motor; a heat controller mechanically connected directly to said motor to be actuated thereby in response to room temperature changes, said motor being adapted for operation at a normal temperature level or at a sub-normal temperature level; an electrical heater element arranged in close proximity to said thermally responsive motor and adapted, when operated, to bias the regulator for sub-normal operation by modifying the effect of the motor on the controller; an electrical circuit in which said heater element is located; a remotely located switch in said circuit for controlling the heater element independently of temperature variations; a local switch for the heat regulator arranged in said circuit and adapted to be opened, if desired, to render the heater element temporarily inoperative; means tending to close said local switch; a movable latch for locking the local switch in open position; means tending to release said latch; and electro-magnetic means interposed in said circuit independently of the local switch and rendered active by closing said remote switch for maintaining said locking action.

3. The combination in a dual temperature heat regulator of a thermally responsive motor; a heat controller mechanically connected directly to said motor to be actuated thereby in response to room temperature changes, said motor being adapted for operation at a normal temperature level or at a sub-normal temperature level; an electrical heater element arranged in close proximity to said thermally responsive motor and adapted, when operated, to bias the regulator for sub-normal operation by modifying the effect of the motor on the controller; an electrical circuit in which said heater element is located; a remotely located switch in said circuit for controlling the heater element independently of temperature variations; a local manually operable switch for the heat regulator arranged in said circuit and adapted to be opened, if desired, temporarily to render said heater element inoperative; resilient means normally holding said local switch closed; a latch adapted, when in latching position, for automatic interlocking engagement with the local switch upon operation thereof to lock the local switch in open position; resilient means normally holding said latch in non-latching position; and electro-magnetic means interposed in said circuit independently of said local switch and adapted to be energized through closing of the remote switch to move the latch into latching position, said resilient means serving, following movement of the local switch to locked position, automatically to restore the local switch to closed position and the latch to non-latching position upon opening of the remote switch and deenergizing of the electro-magnetic means.

4. The combination in a dual temperature heat regulator of a thermally responsive motor; a heat controller mechanically connected directly to said motor to be actuated thereby in response to room temperature changes, said motor being adapted for operation at a normal temperature level or at a sub-normal temperature level; an electrical heater element arranged in close proximity to said thermally responsive motor and adapted, when operated, to bias the regulator for sub-normal operation by modifying the effect of the motor on the controller; an electrical circuit in which said heater element is located; a remotely located switch in said circuit for controlling the heater element independently of temperature variations, said circuit including a primary circuit and a secondary circuit in which the heater element is located; a local switch for the heat regulator arranged in said secondary circuit and adapted to be opened, if desired, to render the heater element temporarily inoperative; means tending to close said local switch; means for locking said local switch in open position; means tending to release said locking means; and means located in said primary circuit and rendered active by closing said remote switch for maintaining said locking action.

5. The combination in a dual temperature heat regulator of a thermally responsive motor having a tube leading therefrom to a hollow annulus; a heat controller mechanically connected directly to said motor to be actuated thereby in response to room temperature changes, said motor being adapted for operation at a normal temperature level or at a sub-normal temperature level; an electrical heater element arranged in close proximity to said thermally responsive motor and adapted, when operated, to bias the regulator for sub-normal operation by modifying the effect of the motor on the controller, said heater element being in the form of a coil wound around said annulus; an electrical circuit in which said heater element is located; and a remotely located switch in said circuit for controlling the heater element independently of temperature variations.

6. The combination in a dual temperature heat regulator of a thermally responsive motor; a heat controller operatively connected directly to said motor to be actuated thereby in response to room temperature changes, said motor being adapted for operation at a normal temperature level or at a sub-normal temperature level; means adapted, when operated, to bias the regulator for sub-normal temperature operation by modifying the effect of the motor on the controller; remote control means for said biasing means; local lockout means on the regulator adapted for manual operation to render said biasing means temporarily inactive; and automatic, delayed-action releasing means for said lock-out means set into operation by actuation of the lock-out to restore the biasing means to active condition.

7. The combination in a dual temperature heat regulator of a thermally responsive motor; a heat controller mechanically connected directly to said motor to be actuated thereby in response to room temperature changes, said motor being adapted for operation at a normal temperature level or at a sub-normal temperature level; an electrical heater element arranged in close proximity to said motor and adapted, when operated, to bias the regulator for sub-normal operation by modifying the effect of the motor on the controller; an electrical circuit in which said heater element is located; a remotely located switch in said circuit for controlling the heater element; a local switch in said ciruit adapted to be opened, if desired, to render the heater element temporarily inoperative; means tending to close said local switch; means for locking said local switch in open position; means tending to secure said locking means; and means controlled by the opening movement of the heat controller for releasing said locking means.

8. The combination in a dual temperature heat regulator of a thermally responsive motor; a heat controller mechanically connected directly to said motor to be actuated thereby in response to room temperature changes, said motor being adapted for operation at a normal temperature level or at a sub-normal temperature level; an electrical heater element arranged in close proximity to said motor and adapted, when operated, to bias the regulator for sub-normal operation by modifying the effect of the motor on the controller; an electrical circuit in which said heater element is located; a remotely located switch in said circuit for controlling the heater element; a local switch in said circuit adapted to be opened, if desired, to render the heater element temporarily inoperative; means tending to close said local switch; a movable latch for locking said local switch in open position; means tending to secure said latch; and a tripping rod on said motor for releasing said latch when the heat controller reaches its full open position.

9. The combination in a dual temperature heat regulator of a thermally responsive motor; a heat controller operatively connected directly to said motor to be actuated thereby in response to room temperature changes, said motor being adapted for operation at a normal temperature level or at a sub-normal temperature level; electrical means on the heat regulator adapted, when operated, to bias the regulator for sub-normal temperature operation by modifying the effect of the motor on the controller; an electrical circuit in which said biasing means are arranged; a remotely located switch in said circuit for controlling the biasing means independently of temperature changes; manual means for the heat regulator adapted to be operated, if desired, to render said biasing means temporarily inoperative; means for locking said manual means in operated position; means tending to release said locking means; and means rendered active by closing said remote switch for maintaining said locking action.

10. The combination in a dual temperature heat regulator of a thermally responsive motor; a heat controller operatively connected directly to said motor to be actuated thereby in response to room temperature changes, said motor being adapted for operation at a normal temperature level or at a sub-normal temperature level; electrical means on the heat regulator adapted, when operated, to bias the regulator for sub-normal temperature operation by modifying the effect of the motor on the controller; an electrical circuit in which said biasing means are arranged; a remotely located switch in said circuit for controlling the biasing means independently of temperature changes; local manual means for the heat regulator adapted to be operated, if desired, to render said biasing means temporarily inoperative; means for locking said manual means in operated position; means tending to release said locking means; means rendered active by closing said remote switch for maintaining said locking action; and additional local manual means adapted, when operated, to render said last-mentioned means and said biasing means inoperative.

11. The combination in a dual temperature heating system of a plurality of heat regulators each including a thermally responsive motor, a heat controller mechanically connected directly to said motor to be actuated thereby in response to room temperature changes, said motor being adapted for operation at a normal temperature level or at a sub-normal temperature level, an electrical heater element adjacent said motor adapted, when operated, to bias the motor for sub-normal temperature operation by modifying the effect of the motor on the controller; an electrical circuit in which all of said heater elements are arranged in parallel; and a remotely located switch in said circuit for controlling the heater elements, each of said heat regulators also being provided with a local switch arranged in said circuit and adapted to be opened, if desired, to render the corresponding heater element temporarily inoperative, means tending to close said local switch, a movable latch for locking the local switch in open position, means tending to release said latch, electro-magnetic means interposed in said circuit independently of the local switch and rendered active by closing the remote switch to maintain said locking action, and a second local switch in said circuit which, when open, renders said last-mentioned means and said heater element inoperative, said second-mentioned local switch being adapted for key operation.

12. The combination in a dual temperature heat regulator of a thermally responsive motor; a heat controller operatively connected directly to said motor to be actuated thereby in response to room temperature changes, said motor being adapted for operation at a normal temperature level or at a sub-normal temperature level; electrical means on the heat regulator adapted, when operated, to bias the regulator for sub-normal temperature operation by modifying the effect of the motor on the controller; an electrical circuit in which said biasing means are arranged; a remotely located, manually operable switch in said circuit for controlling the biasing means; a local switch on the heat regulator arranged in said circuit, said switch being adapted for manual actuation, if desired, to render the biasing means temporarily inoperative when the remote control switch is closed and to close again automatically; and a second local switch on the heat regulator arranged in said circuit, said second-mentioned local switch being adapted for key operation and, when open, to render the heater element permanently inoperative.

13. A heating system including a radiator for heating a room or other space, a valve controlling admission of heating fluid to said radiator, temperature responsive means operable at predetermined room temperature to move said valve toward closed position, an electric heating means for said responsive means operable when energized to cause said responsive means to move said valve toward closed position at a predetermined lower room temperature whereby to maintain the room temperature at a predetermined lower degree, an electric switch remote from said radiator for closing the circuit to said heating means, an electric switch for breaking the circuit established by said first-named switch, and means controlled by said first switch to hold said second-named switch in circuit breaking position.

14. A heating system including a radiator for heating a room or other space, a valve controlling admission of heating fluid to said radiator, temperature responsive means operable at predetermined room temperature to move said valve toward closed position, an electric heating means for said responsive means operable when energized to cause said responsive means to move said valve toward closed position at a predetermined lower room temperature whereby to maintain the room temperature at a predetermined lower degree, an electric switch remote from said radiator for closing the circuit to said heating means, an electric switch biased to closed position and operable to break the circuit established by said first-named switch, and means controlled by said first switch to hold said second-named switch in circuit breaking position.

15. A heating system including a radiator for heating a room or other space, a valve controlling admission of heating fluid to said radiator, temperature responsive means operable at predetermined room temperature to move said valve toward closed position, electric means for said responsive means operable when energized to cause said responsive means to move said valve toward closed position at a predetermined lower room temperature whereby to maintain the room temperature at a predetermined lower degree, an electric switch remote from said radiator for closing the circuit to said electric means, an electric switch for breaking the circuit established by said first-named switch, and means controlled by said first switch to hold said second-named switch in circuit breaking position.

16. The combination of means for controlling a heat exchanging medium; a thermally responsive device arranged to actuate said controlling means; means associated with said thermally responsive device for conditioning the same to respond at either of two characteristically different temperatures; an electric circuit whose energization and deenergization, respectively, serves to control the conditioning means; a local switch manually operable to a position in which said conditioning means is disconnected from said circuit; means biasing said switch to a position in which said conditioning means is connected in said circuit; and means rendered effective by the energization of the circuit for holding said local switch in the first-named position when moved thereto.

17. The combination of means for controlling a heat exchanging medium; a thermally responsive device arranged to actuate said controlling means; means associated with said thermally responsive device for conditioning the same to respond at either of two characteristically different temperatures; an electric circuit whose energization and deenergization, respectively, serves to control the conditioning means; an electric switch interposed in said circuit at a point remote from said controlling means; a local switch manually operable to a position in which said conditioning means is disconnected from said circuit; means biasing said local switch to a position in which said conditioning means is connected in said circuit; and electromagnetic means rendered effective by the energization of the circuit for holding said local switch in the first-named position when moved thereto.

CARL A. OTTO.